United States Patent
Greif et al.

(10) Patent No.: US 11,589,493 B2
(45) Date of Patent: Feb. 28, 2023

(54) METHOD FOR DETECTING INADMISSIBLE OPERATING CONDITIONS OF WORK HYDRAULICS OF AN AGRICULTURAL TRACTOR

(71) Applicant: DEERE & COMPANY, Moline, IL (US)

(72) Inventors: Felix P. Greif, Eberbach (DE); Marc Schäfer, Mainz (DE)

(73) Assignee: DEERE & COMPANY, Moline, IL (US)

( * ) Notice: Subject to any disclaimer, the term of this patent is extended or adjusted under 35 U.S.C. 154(b) by 366 days.

(21) Appl. No.: 16/985,389

(22) Filed: Aug. 5, 2020

(65) Prior Publication Data
US 2021/0076555 A1 Mar. 18, 2021

(30) Foreign Application Priority Data

Sep. 18, 2019 (DE) ........................ 102019214228.1

(51) Int. Cl.
*A01B 63/10* (2006.01)
*A01B 63/112* (2006.01)
*F15B 11/08* (2006.01)
*F15B 13/01* (2006.01)

(52) U.S. Cl.
CPC ........ *A01B 63/1006* (2013.01); *A01B 63/112* (2013.01); *F15B 11/08* (2013.01); *F15B 13/015* (2013.01)

(58) Field of Classification Search
CPC ............... A01B 63/10; A01B 63/1006; A01B 63/112; F15B 13/01; F15B 13/015; F15B 11/08
See application file for complete search history.

(56) References Cited

U.S. PATENT DOCUMENTS

| 4,688,381 A * | 8/1987 | Aichele et al. ..... F15B 13/0417 60/452 |
| 9,683,587 B2 * | 6/2017 | Ito et al. ................ F15B 11/003 |
| 2019/0116718 A1 * | 4/2019 | Ito et al. ................. F15B 13/02 |

FOREIGN PATENT DOCUMENTS

| DE | 263843 A1 * | 1/1989 | |
| DE | 10304377 B3 | 4/2004 | |
| DE | 102006004423 A1 * | 8/2007 | ............. A01B 63/10 |
| DE | 102010034613 A1 | 2/2012 | |

OTHER PUBLICATIONS

European Search Report issued in counterpart application No. 20193514.5 dated Feb. 5, 2021 (05 pages).

* cited by examiner

*Primary Examiner* — Tara Mayo-Pinnock

(57) ABSTRACT

A method is provided for detecting inadmissible operating states of a work hydraulics of an agricultural tractor. The method includes providing at least one electrically actuated control valve, a branch allocated to the at least one control valve, and an operating unit for the manual actuation of the work hydraulics of a front linkage. The method also includes connecting the at least one electrically actuated control valve to a hydraulic consumer via a hydraulic coupling, supplying hydraulic fluid to a hydraulic lifting device of the front linkage, detecting a state variable indicative of a connection state of the hydraulic coupling by a sensor unit and communicated to a control unit, and deactivating the operating unit if the control unit identifies by way of the evaluation of the state variable that a hydraulic consumer is connected to the hydraulic coupling.

20 Claims, 2 Drawing Sheets

METHOD FOR DETECTING INADMISSIBLE OPERATING CONDITIONS OF WORK HYDRAULICS OF AN AGRICULTURAL TRACTOR

RELATED APPLICATIONS

This application claims priority to German Patent Application Ser. No. 102019214228.1, filed Sep. 18, 2019, the disclosure of which is hereby incorporated by reference in its entirety.

FIELD OF THE DISCLOSURE

The present disclosure relates to a method for detecting inadmissible operating conditions of work hydraulics of an agricultural tractor, and in particular to work hydraulics including at least one electrically actuated control valve having a hydraulic coupling for connecting a hydraulic consumer, a branch that is allocated to the at least one control valve so as to supply a hydraulic lifting device of a front linkage with hydraulic fluid and an operating unit that is provided for the manual actuation of the hydraulic lifting device of the front linkage.

BACKGROUND

Modern agricultural tractors render it possible to perform the most different work tasks in municipal, forestry and agricultural sectors. This versatility is realized in particular by virtue of the possibility of combining a multiplicity of the different attachment devices. The latter may be attached by way of example by a three-point linkage that is arranged in the front or rear region of the agricultural tractor. Depending upon the type of attachment device and the work function being performed, the attachment device may have its own hydraulic consumer in the form of hydraulic drive units or control facilities. With regard to hydraulic systems that are provided in the agricultural tractor, the drive units or control facilities are supplied with hydraulic fluid, for which the hydraulic drive units or control facilities may be connected via connection hoses to control valves on the agricultural tractor, the control valves being provided in associated control devices (e.g., SCVs—selective control valves) and in turn the control valves may be electrically actuated by operating elements that are accommodated in a driver's cabin or control panel. Each of the control valves that are combined in pairs to form a common control device so as to provide a supply line and return line comprises a releasable hydraulic coupling to which it is possible to connect a complementarily designed hydraulic coupler of a respective connection hose of the attachment device.

Control devices of this type are frequently provided exclusively in the rear region of the agricultural tractor but not in the front region. Therefore, if the agricultural tractor is to be equipped with a front linkage, the associated hydraulic lifting device, in other words the two lifting cylinders of the front linkage, is controlled via one of the control devices that are located in the rear region. For this purpose, at least one of the control valves of the relevant control device is allocated a branch that leads in the direction of the hydraulic lifting device. If the hydraulic lifting device comprises dual-acting lifting cylinders, the two control valves are allocated a branch of this type as a supply line or return line, in the case of a single-acting lifting cylinder a single branch is sufficient as a supply line.

If, at the same time, a hydraulic drive unit or a control facility of an attachment device is connected to the hydraulic coupler of the at least one control valve, it is possible in the case of the hydraulic lifting device being actuated that undesired movements or deflections occur at the attachment device at the same time.

There is a need for a method such that, in the case of a control valve that is used for a hydraulic lifting device of a front linkage, undesired movements or deflections do not occur at an attachment device that is likewise connected thereto.

SUMMARY

In the present disclosure, a method is provided for detecting inadmissible operating conditions of work hydraulics of an agricultural tractor in which the work hydraulics comprise at least one electrically actuated control valve having an hydraulic coupling for connecting a hydraulic consumer, a branch that is allocated to the at least one control valve so as to supply a hydraulic lifting device of a front linkage with hydraulic fluid and an operating unit that is provided for the manual actuation of the work hydraulics of the front linkage. In accordance with the present disclosure, a state variable that indicates a connection state of the hydraulic coupling is ascertained by a sensor unit and supplied to a control unit, wherein the operating unit is deactivated if the control unit identifies by way of the evaluation of the state variable that a hydraulic consumer is connected to the hydraulic coupling.

It is possible in this manner to avoid an actuation of the hydraulic lifting device that is performed by the operating unit leading to undesired movements or deflections at an attachment device that is connected to the same control valve.

The operating unit may be a remote control unit that has button switches and is connected to the control unit so as to raise and lower the front linkage and is attached in the region of the front linkage. In such a case, the method in accordance with the present disclosure is of particular advantage since the attachment device that is located in the rear region is not visible as the remote control unit that is arranged in the front region is actuated, with the result that it is not possible or is only possible at a comparatively late stage to perceive an action that is triggered thereon.

The hydraulic coupling has a pivotable dust protection cover, wherein the sensor unit detects if the dust protection cover is in a pivot position A that seals (closes) the hydraulic coupling or is located in a pivot position B that releases (opens) the hydraulic coupling. The sensor unit may be a robust magnetic switch that is actuated by a permanent magnet that is embedded in the dust protective cover. The circumstance that the dust protective cover is located in its open pivot position B is a reliable indication that a hydraulic coupler and thus a connection hose that leads to a hydraulic consumer of an attachment device is connected to the relevant hydraulic coupling. In the case of a pair of control valves that are combined to form a common control device, the state variables that are provided by the sensor units of the associated two dust protection covers are OR-linked to one another by the control unit with the result that the operating unit is then already deactivated if one of the two dust protective covers is located in its open pivot position B. In order to ensure that, when the hydraulic coupler is in the unused state, the dust protection cover is actually located in its closed pivot position A, the dust protection cover may be provided with a closing mechanism in the form of a return spring or the like.

Furthermore, there is the possibility that, in dependence upon the ascertained state variables, the control unit deactivates or blocks an operating element that is provided for the manual actuation of the at least one control valve. Typically, the operating element is accommodated in the form of a button switch (so-called paddle pot switch) in an operating panel of the agricultural tractor. The operating element is deactivated or blocked by the control unit in particular then if it is determined on the basis of the ascertained state variables that a hydraulic consumer is not connected to the hydraulic coupling of the associated control valve, thus the operating element is functionless. This generally then applies if the dust protection cover of the at least one control valve is located in its closed pivot position A. It is hereby rendered possible to prevent the closed hydraulic coupler being influenced with a pressurized hydraulic fluid as a result of the functionless operating element. If, in the case of a pair of control valves that have been combined to form one common control device, only one of the control valves is used to operate a single-acting hydraulic consumer, only the operating element that is allocated to the control valve that is not being used is deactivated or blocked. This may also be made dependent upon the presence of a cut-off valve that is provided in the branch in the direction of the hydraulic lifting device of the front linkage, wherein the operating element is deactivated or blocked and otherwise enabled exclusively in the case of a closed cut-off valve with the result that it remains possible to control the front linkage via the relevant operating element.

In addition, it is feasible that the control unit controls a display unit in dependence upon the ascertained state variable, in particular in order to indicate that an operating element that is provided for the manual actuation of the at least one control valve is deactivated or blocked. The display unit may be a red light-emitting diode that is spatially directly allocated to the operating element. In addition, the display unit may also comprise a green light-emitting diode that is activated in lieu of the red light-emitting diode in the case of the operating element being enabled.

For the purpose of decommissioning the front linkage, it is possible to interrupt the branch in the direction of the hydraulic lifting device by a cut-off valve. This is inter alia then relevant if it is to be avoided during transportation journeys or the like that the front linkage drops down as a result of a leakage or in order to be able to limit the at least one control valve to the operation of a hydraulic consumer that is connected thereto.

In so doing, it is possible to provide that, by a further sensor unit, a valve position variable is ascertained that indicates an open state of the cut-off valve, wherein an operating element that is provided for the manual actuation of the at least one control valve is deactivated or blocked in dependence upon the ascertained valve position variable. This may then take place if, by way of the evaluation of the state variable in conjunction with the state variable that is ascertained by the sensor unit, the control unit identifies that the cut-off valve is open in the direction of the hydraulic lifting device and at the same time a hydraulic consumer is connected to the hydraulic coupling of the at least one control valve, which may be identified by the control unit in particular on the basis of a dust protection cover that is located in its open pivot position B. It is possible to prevent the hydraulic lifting device of the front linkage being inadvertently simultaneously actuated via the operating element. In addition, it is possible by outputting a corresponding instruction via an information unit to prompt the operator to close the cut-off valve with the result that the operating element may be safely enabled so as to actuate the hydraulic consumer.

The cut-off valve may be designed in addition so as to be electrically actuated, wherein the cut-off valve remains closed at the instigation of the control unit for as long as it is indicated by way of the evaluation of the ascertained state variable that a hydraulic consumer is connected to the hydraulic coupling of the at least one control valve. This may be detected by the control unit on the basis of a dust protection cover being located in its open pivot position B. As soon as the dust protective cover is moved into its closed pivot position A, the cut-off valve is automatically opened by the control unit. The procedure of switching over in this manner means that, in the case of a connected hydraulic consumer, the operating element that is allocated to the at least one control valve prevents the operator from the start from unintentionally actuating the front linkage.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
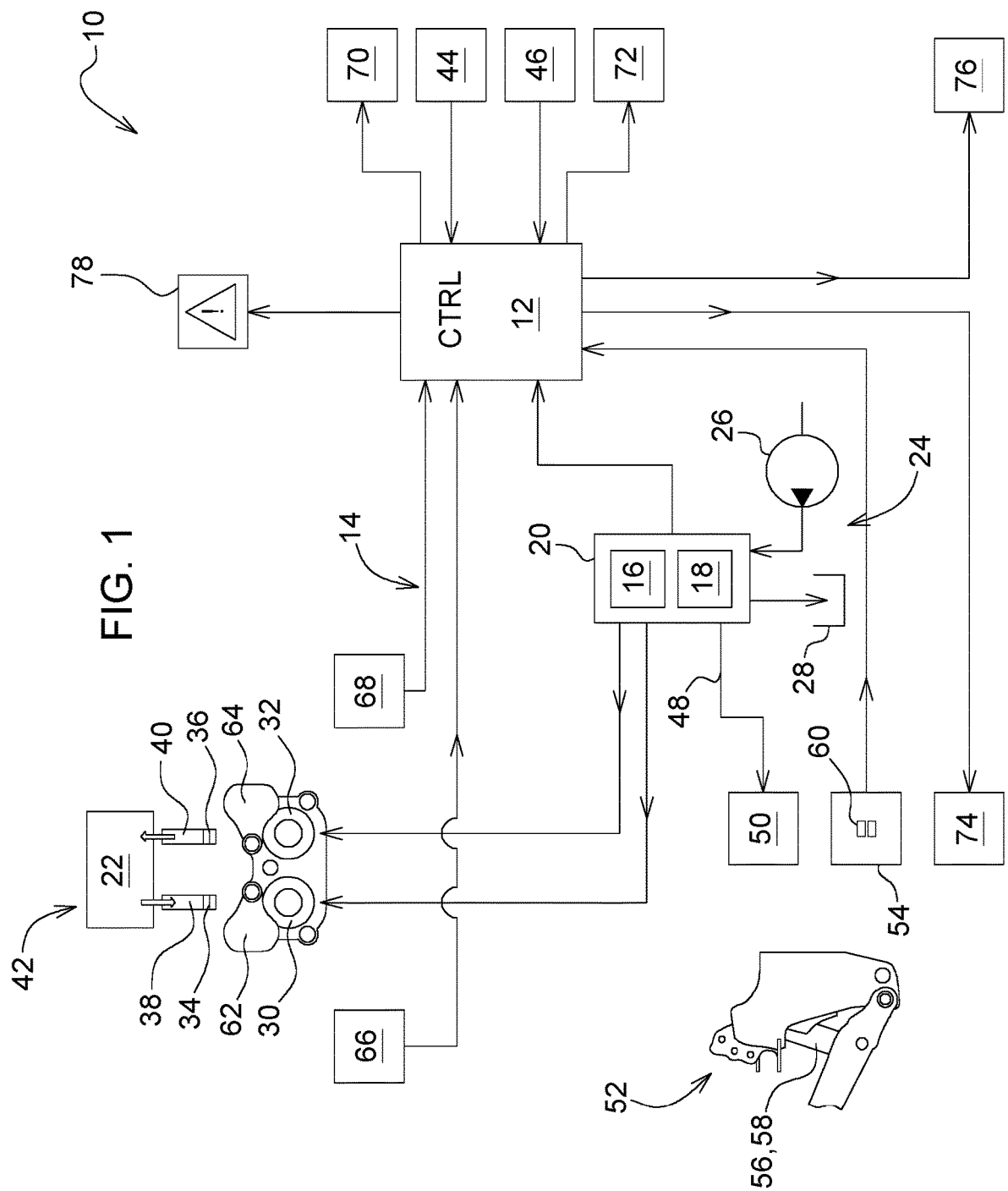
FIG. 1 shows a schematically illustrated arrangement for performing the method in accordance with the present disclosure.

FIG. 1 illustrates an arrangement that is provided in an agricultural tractor, not illustrated, for performing the method in accordance with the present disclosure. The arrangement 10 comprises a microprocessor-controlled control unit 12 and work hydraulics 14, which have a first control valve 16 that is electrically actuated by the control unit 12 and a second control valve 18 that is electrically actuated by the control unit 12. So as to provide a supply line and return line, the two control valves 16, 18 are combined in pairs to form a common control device 20 that so as to supply a hydraulic consumer 22 with hydraulic fluid communicates with a hydraulic system 24 that is likewise provided in the agricultural tractor, the hydraulic system comprising essentially a hydraulic high-pressure pump 26 and a reservoir 28 for hydraulic fluid. The function of a hydraulic system 24 is sufficiently known with the result that a further description is not required at this juncture. The control device 20 is also described in general linguistic usage as a SCV or selective control valve.

Each of the two control valves 16, 18 is allocated a releasable hydraulic coupling 30, 32 to which a complementarily designed hydraulic coupling 34, 36 of a respective connection hose 38, 40 of the hydraulic consumer 22 may be connected. In contrast to the illustration in FIG. 1, the hydraulic couplings 30, 32 are generally structurally integrated into the control device 20.

The hydraulic consumer 22 is a component of an attachment device 42 that is attached to a three-point linkage that is arranged in the rear region of the agricultural tractor. The three-point linkage is not illustrated in FIG. 1 for the sake of clarity. Depending upon the type of attachment device and work function to be performed, the hydraulic consumer 22 is designed in the form of hydraulic drive units or control facilities. However, in lieu of a three-point linkage, it may also be any other coupling facility for attaching an attachment device, such as, for example, a towing coupling or a pick-up hitch.

An arrangement that communicates with the control unit 12 and comprises two operating elements 44, 46 that are accommodated in a driver's cabin or control panel of the agricultural tractor and are designed as button switches (so-called paddle pod switches) render it possible for a driver to manually actuate the two control valves 16, 18 so as to perform the work function that is allocated to the hydraulic consumer 22.

Representatively, only a single control valve 20 is illustrated in FIG. 1, whereas actually generally a multiplicity of further similarly designed control devices are provided that are mounted in a stack one above the other in the rear region of the agricultural tractor.

Furthermore, a branch 48 is provided that is allocated to at least one of the control valves 16, 18 so as to supply a hydraulic lifting device 50 of a front linkage 52 with hydraulic fluid and an operating unit 54 is provided for the manual actuation of the hydraulic lifting device 50 of the front linkage 52. The branch 48 renders it possible to control in a hydraulic manner the hydraulic lifting device 50, therefore the two lifting cylinders 56, 58 of the front linkage 52, by using the existing control valve 16, 18. If the hydraulic lifting device 50 has dual-acting lifting cylinders 56, 58, the two control valves 16, 18 are allocated a branch of this type as a supply line or return line, in the case of a single-acting lifting cylinder 56, 58 a single branch is sufficient as a supply line.

The operating unit 54 is a remote control unit 60 that is connected to the control unit 12 and comprises button switches for raising and lowering the front linkage 52. The remote control unit 60 is attached in the region of the front linkage 52.

Each of the two hydraulic couplings 30, 32 has a pivotable dust protection cover 62, 64, wherein by a sensor unit 66, 68 it is detected whether the dust protection cover 62, 64 is in a pivot position A that seals (closes) the associated hydraulic coupling 30, 32 or in a pivot position B that releases (opens) the associated hydraulic coupling 30, 32. The sensor unit 66, 68 is in each case a magnetic switch that is actuated by a permanent magnet that is embedded in the associated dust protection cover 62, 64. The circumstance that the dust protective cover 62, 64 is located in its open pivot position B is a reliable indication that a hydraulic coupler 34, 36 and thus a connection hose 38, 40 that leads to a hydraulic consumer 22 of an attachment device 42 is connected to the relevant hydraulic coupling 30, 32. The pivot position that is detected by the sensor unit 66, 68 thus forms a state variable that indicates a connection state of the hydraulic coupling 30, 32. The state variables that are provided by the two sensor units 66, 68 are supplied to the control unit 12 for evaluation.

In addition, a display unit 70, 72 that is controllable by the control unit 12 is provided and used to indicate that the operating element 44, 46 that is provided for the manual actuation of the control valve 16, 18 is deactivated or blocked. The display unit 70, 72 may be a red light-emitting diode that is spatially directly allocated to the operating element 44, 46.

For the purpose of decommissioning the front linkage 52, it is possible to interrupt the branch 48 in the direction of hydraulic lifting device 50 by a cut-off valve 74 that is provided in the work hydraulics 14. A further sensor unit 76 is used to ascertain a valve position variable that indicates an open state of the cut-off valve 74 and is likewise supplied to the control unit 12 for the purpose of evaluation. In accordance with an optional embodiment of the work hydraulics 14, the cut-off valve 74 is designed so as to be electrically actuated by the control unit 12.

An information unit 78 that communicates with the control unit 12 and is in the form of an OLED display renders it possible to output additional instructions to the driver.

Figure 2:
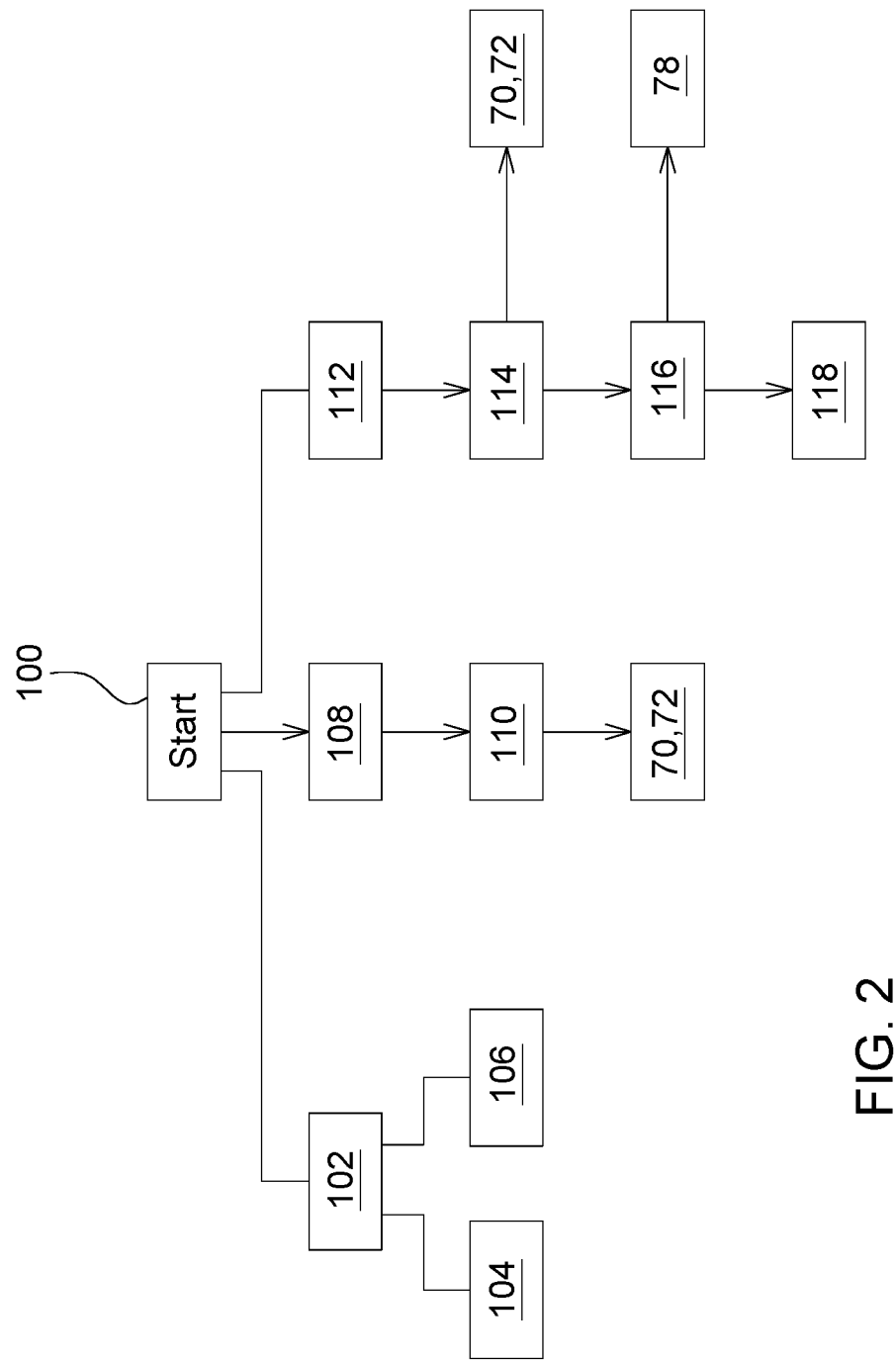
FIG. 2 shows a flow diagram that illustrates the method in accordance with the present disclosure.

FIG. 2 illustrates in the form of a flow diagram an embodiment of the method in accordance with the present disclosure for detecting inadmissible operating states of the work hydraulics 14 of the agricultural tractor.

The method that is performed by the control unit 12 is started in an initialization step 100. In so doing, different functions are realized.

Basic Function

In accordance with a basic function that is performed by the control unit 12, the state variables that are ascertained by the sensor units 66, 68 are initially evaluated in a first step 102. If it is indicated by way of an OR-linking of the state variables that are provided by the two sensor units 66, 68 that one of the two dust protection covers 62, 64 are located in its open pivot position B then the control unit 12 concludes therefrom that a hydraulic consumer 22 of an attachment device 42 is connected to the relevant hydraulic coupling 30, 32. Therefore, in order to avoid that an actuation of the hydraulic lifting device 50 that is performed by way of the operating unit 54 simultaneously leads to undesired movements or deflections at the attachment device 42, the operating unit 54 is deactivated by the control unit 12 in a second step 104. Accordingly, the operating element 54 is enabled for the opposite case in which the control unit 12 establishes by way of the evaluation of the state variables that are provided by the two sensor units 66, 68 that the two dust protection covers 62, 64 are located in their closed pivot position A, thus allowing an actuation of the front linkage 52.

If the cut-off valve 74 is designed so as to be electrically actuated, it remains closed at the instigation of the control unit 12 for as long as it is indicated by way of the evaluation of the ascertained state variables in the first step 102 that a hydraulic consumer 22 is connected to one of the hydraulic couplings 30, 32. As soon as the two dust protection covers 62, 64 are moved into their closed pivot position A, the cut-off valve 74 is automatically opened by the control unit 12 in a third step 106. The procedure of switching over in this manner means that, in the case of a connected hydraulic consumer 22, the operator is prevented from unintentionally actuating the front linkage 52 via the operating elements 44, 46.

Consequently the attachment device 42 or the work function that is allocated to the corresponding hydraulic consumer 22 is prioritized.

First Additional Function

In accordance with a first additional function that is performed by the control unit 12, an evaluation of the state variables that are provided by the two sensor units 66, 68 is repeated in a fourth step 108. If it is indicated that one of the two dust protection covers 62, 64 are located in its closed pivot position A and the cut-off valve 74 is closed, the operating element 44, 46 that is provided for the manual actuation of the associated control valve 16, 18 is deactivated or blocked by the control unit 12 in a fifth step 110. At the same time, the display unit 70, 72 that is spatially directly allocated to the relevant operating element 44, 46 is controlled in order to visually signal by the associated red light-emitting diode that the operating element is deactivated or blocked. It is hereby rendered possible to prevent the closed hydraulic coupler 30, 32 being influenced with a pressurized hydraulic fluid as a result of the functionless operating element 44, 46. If only one of the control valves 16, 18 is used to operate a single-acting hydraulic consumer 22, only the operating element 44, 46 that is allocated to the control valve 16, 18 that is not being used is deactivated or blocked. This may be made dependent upon the open state of the cut-off valve 48 that is represented by the ascertained valve position variable, wherein the operating element 44, 46 is deactivated or blocked and otherwise enabled exclusively in the case of a closed cut-off valve 48 with the result that it remains possible to control the front linkage 52 via the relevant operating element 44, 46.

Second Additional Function

In addition, a second additional function that is performed by the control unit 12 is provided. In this case, in a sixth step 112, the valve position variable is evaluated in conjunction with the state variables that are provided by the two sensor units 66, 68. If it is indicated that the cut-off valve 74 is open in the direction of the hydraulic lifting device 50 of the front linkage 52 and at the same time one of the two dust protection covers 62, 64 is located in its open pivot position B, a hydraulic consumer 22 is thus connected to the relevant hydraulic coupling 30, 32, then the operating element 44, 46 that is provided for the manual actuation of the associated control valve 16, 18 is deactivated or blocked by the control unit 12 in a seventh step 114. It is thus possible to prevent the hydraulic lifting device 50 of the front linkage 52 being inadvertently simultaneously actuated via the operating element 44, 46.

In addition, the display unit 70, 72 that is in the form of the respective red light-emitting diode and that is spatially directly allocated to the operating element 44, 46 is controlled with the result that at the same time a visual signal is output to indicate that the relevant operating element 44, 46 is deactivated or blocked. If it is detected in an eighth step 116 that the driver intends to actuate the operating element 44, 46 and thus also the hydraulic consumer 22 that is connected thereto, then the control unit 12 is prompted to output via the information unit 78 an instruction to the driver that the cut-off valve 74 is to be closed. As soon as this occurs, the operating element 44, 46 is enabled in a ninth step 118 and the control of the display unit 70, 72 terminated.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for detecting operating states of a work hydraulics of an agricultural tractor, comprising:
providing at least one electrically actuated control valve, a branch allocated to the at least one control valve, and an operating unit for the manual actuation of the work hydraulics of a front linkage;
connecting the at least one electrically actuated control valve to a hydraulic consumer via a hydraulic coupling;
supplying hydraulic fluid to a hydraulic lifting device of the front linkage;
detecting a state variable indicative of a connection state of the hydraulic coupling by a sensor unit and communicated to a control unit; and
deactivating the operating unit if the control unit identifies by way of the evaluation of the state variable that a hydraulic consumer is connected to the hydraulic coupling.

2. The method according to claim 1, further comprising providing the hydraulic coupling with a pivotable dust protection cover.

3. The method according to claim 2, further comprising detecting by the sensor unit if the dust protection cover is in a first pivot position that seals the hydraulic coupling or in a second pivot position that releases the hydraulic coupling.

4. The method according to claim 1, wherein depending upon the detected state variable, the control unit deactivates an operating element provided for the manual actuation of the at least one control valve.

5. The method according to claim 1, further comprising controlling a display unit by the control unit in dependence upon the detected state variable.

6. The method according to claim 1, further comprising interrupting the branch in a direction of the hydraulic lifting device via a cut-off valve.

7. The method according to claim 6, further comprising detecting a valve position variable by a second sensor unit which is indicative of an open state of the cut-off valve.

8. The method according to claim 7, further comprising providing an operating element for the manual actuation of the at least one control valve.

9. The method of claim 8, further comprising deactivating the operating element in dependence upon the detected valve position variable.

10. The method according to claim 6, wherein the cut-off valve is electrically actuated.

11. The method of claim 10, further comprising maintaining the cut-off valve in a closed position at the instigation of the control unit for as long as it is indicated by the evaluation of the detected state variable that a hydraulic consumer is connected to the hydraulic coupling of the at least one control valve.

12. A method for detecting operating states of a work hydraulics of an agricultural tractor, comprising:
providing an electrically actuated control valve, a branch allocated to the control valve, and an operating unit for the manual actuation of the work hydraulics of a front linkage;
connecting the electrically actuated control valve to a hydraulic consumer via a hydraulic coupling, the hydraulic coupling including a pivotable dust protection cover;
supplying hydraulic fluid to a hydraulic lifting device of the front linkage;
detecting a state variable indicative of a connection state of the hydraulic coupling by a sensor unit;

communicating the detected state variable via the sensor unit to a control unit;

deactivating the operating unit if the control unit identifies by way of the evaluation of the state variable that a hydraulic consumer is connected to the hydraulic coupling; and detecting by the sensor unit if the dust protection cover is in a first pivot position that seals the hydraulic coupling or in a second pivot position that releases the hydraulic coupling.

13. The method according to claim 12, wherein depending upon the detected state variable, the control unit deactivates an operating element provided for the manual actuation of the at least one control valve.

14. The method according to claim 12, further comprising controlling a display unit by the control unit in dependence upon the detected state variable.

15. The method according to claim 12, further comprising interrupting the branch in a direction of the hydraulic lifting device via a cut-off valve.

16. The method according to claim 15, further comprising detecting a valve position variable by a second sensor unit which is indicative of an open state of the cut-off valve.

17. The method according to claim 16, further comprising:

providing an operating element for the manual actuation of the at least one control valve; and deactivating the operating element in dependence upon the detected valve position variable.

18. The method according to claim 16, further comprising maintaining the cut-off valve in a closed position at the instigation of the control unit for as long as it is indicated by the evaluation of the detected state variable that a hydraulic consumer is connected to the hydraulic coupling of the at least one control valve.

19. A method for detecting operating states of a work hydraulics of an agricultural tractor, comprising:

providing an electrically actuated control valve, a branch allocated to the control valve, and an operating unit for the manual actuation of the work hydraulics of a front linkage;

connecting the electrically actuated control valve to a hydraulic consumer via a hydraulic coupling, the hydraulic coupling including a pivotable dust protection cover;

supplying hydraulic fluid to a hydraulic lifting device of the front linkage;

detecting a state variable indicative of a connection state of the hydraulic coupling by a sensor unit;

communicating the detected state variable via the sensor unit to a control unit;

deactivating the operating unit if the control unit identifies by way of the evaluation of the state variable that a hydraulic consumer is connected to the hydraulic coupling;

detecting by the sensor unit if the dust protection cover is in a first pivot position that seals the hydraulic coupling or in a second pivot position that releases the hydraulic coupling;

controlling a display unit by the control unit in dependence upon the detected state variable; and interrupting the branch in a direction of the hydraulic lifting device via a cut-off valve.

20. The method according to claim 19, wherein depending upon the detected state variable, the control unit deactivates an operating element provided for the manual actuation of the at least one control valve.

* * * * *